United States Patent [19]

Harmony

[11] 4,268,567
[45] * May 19, 1981

[54] INSULATOR FOR CANNED DRINKS

[76] Inventor: Richard C. Harmony, 3426 N. Forgeus Ave., Tucson, Ariz. 85716

[*] Notice: The portion of the term of this patent subsequent to Jan. 1, 1997, has been disclaimed.

[21] Appl. No.: 70,121

[22] Filed: Aug. 27, 1979

Related U.S. Application Data

[63] Continuation of Ser. No. 946,362, Sep. 27, 1978, Pat. No. 4,181,765.

[51] Int. Cl.³ .............................................. B32B 3/26
[52] U.S. Cl. .................................. 428/195; 150/52 R; 215/12 R; 215/12 A; 215/13 R; 428/40; 428/41; 428/58; 428/77; 428/157; 428/159; 428/310; 428/315; 428/338; 428/339; 428/352
[58] Field of Search ................. 428/194, 195, 35, 261, 428/192, 157, 40, 41, 158, 57, 58, 77, 159, 310, 315, 338, 339, 352; 150/52 R; 215/12 R, 12 A, 13 R

[56] References Cited

U.S. PATENT DOCUMENTS

| | | | |
|---|---|---|---|
| 2,000,763 | 5/1935 | Lane | 428/194 |
| 2,096,351 | 10/1937 | Semonsen | 428/194 X |
| 3,638,340 | 2/1972 | Gottschalk | 428/194 X |
| 4,094,715 | 6/1978 | Henderson et al. | 428/36 X |
| 4,173,290 | 11/1979 | Kobayashi et al. | 428/35 X |
| 4,181,765 | 1/1980 | Harmony | 428/157 |

Primary Examiner—Thomas J. Herbert, Jr.
Attorney, Agent, or Firm—Cahill, Sutton & Thomas

[57] ABSTRACT

An elongated sheet of crosslinked polyethylene foam, which type of foam can be imprinted with conventional printing inks, is wrapped about the cylindrical surface of a cylindrical container for thermal insulation of the container contents. A strip of adhesive is deposited upon one side at one end of the sheet to receive and removably retain an overlapped portion of the other end of the sheet to secure the sheet about the container.

8 Claims, 4 Drawing Figures

U.S. Patent
May 19, 1981
4,268,567
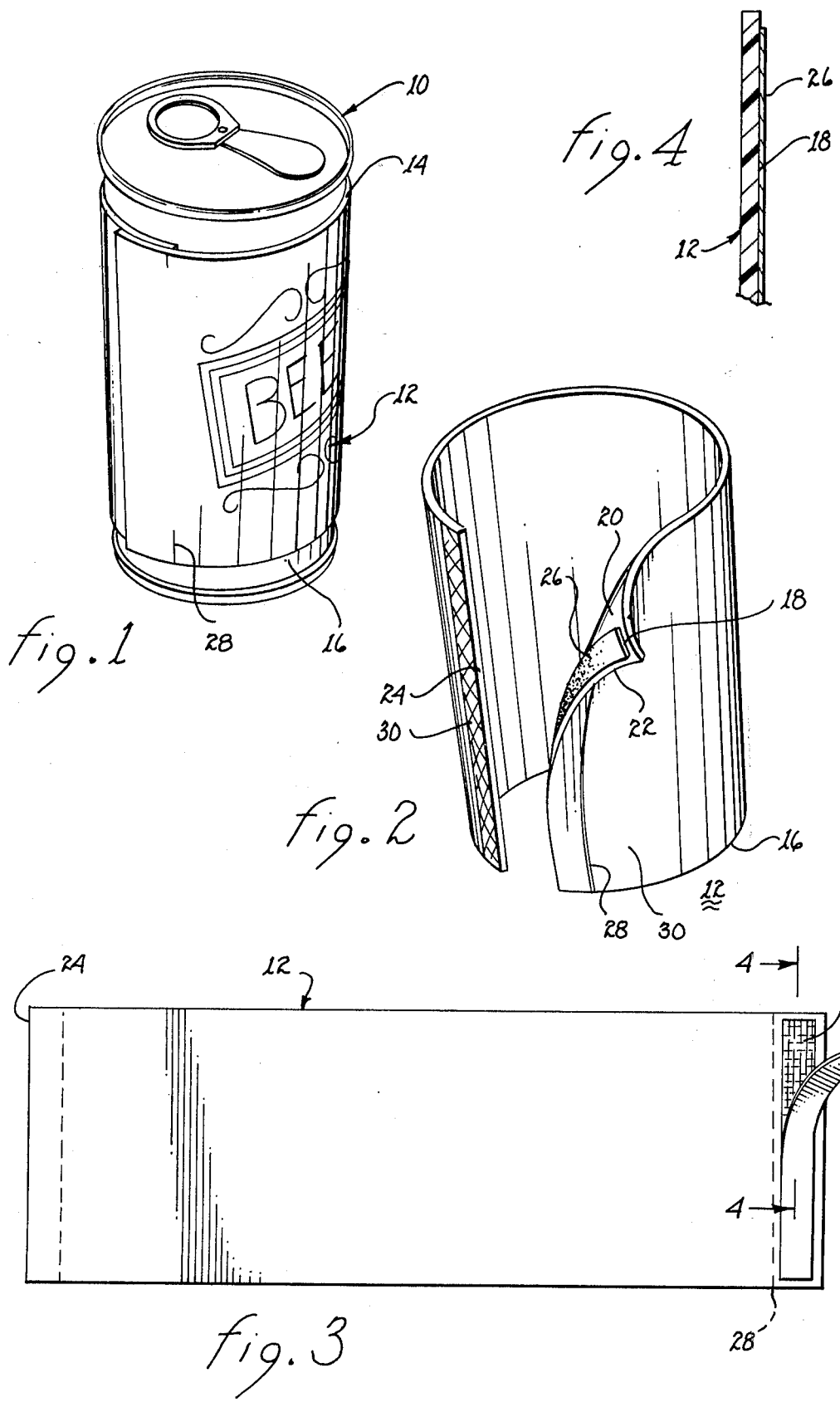

INSULATOR FOR CANNED DRINKS

This is a continuation, of application, Ser. No. 946,362, filed Sept. 27, 1978 now U.S. Pat. No. 4,181,765.

The present invention relates to insulators and, more particularly, to compactly storable and reusable insulators for cylindrical containers.

Many cylindrical containers, such as glass bottles and cans, contain liquids which are intended to be consumed while chilled. Normally, these bottles or cans are served upon removal from a refrigerator or ice chest. If consumption is rapid enough, the liquid is consumed while still at least somewhat chilled. However, in high temperature environments, particularly when subjected to the rays of the sun, the temperature of the fluid may rise rapidly. To permit dawdling consumption of the fluid without the penalty of drinking a warmed drink, various cup shaped insulators have been developed and marketed.

In operation, the bottle or can is placed within the cup shaped insulator and the latter is retained in place either by friction due to a tight fit or by a plastic collar disposed about the top open end of the insulator. A degree of thermal insulation is achieved but the cup like insulators suffer from several disadvantages.

Styrofoam and polyurethane, the material from which the cup shaped insulators are made, are not particularly resilient and elastic; therefore, the sides or bottom of the cup-like insulator readily cracks upon even minor misuse or abuse. Moreover, the styrofoam and polyurethane readily gouges on impact with a rigid object. Since these cup-like insulators can not be collapsed without damage and as they are not generally nestable, storage during nonuse becomes a real and practical problem. Additionally, packaging of the cup-like insulators during both transportation and sale thereof requires an inordinate volume requirement not commensurate with the sales price and profit margins.

It is therefore a primary object of the present invention to provide a reusable insulator for cylindrical containers.

Another object of the present invention is to provide a compactly storable insulator for cylindrical containers which is collapsible to a planar configuration during non-use.

Yet another object of the present invention is to provide a self-adhering sheet insulator for circumscribing a liquid container.

Still another object of the present invention is to provide a crosslinked polyethylene insulator detachably mountable about a container.

A further object of the present invention is to provide an imprintable polyethylene insulator mountable about a container.

A yet further object of the present invention is to provide a reusable and compactly storable foam insulator for liquid containers.

A still further object of the present invention is to provide an inexpensive reusable insulator for drink containers.

These and other objects of the present invention will become apparent to those skilled in the art as the description thereof proceeds.

The present invention may be described with greater specificity and clarity with reference to the following drawings, in which:

FIG. 1 is a perspective view illustrating the use of the present invention;

FIG. 2 is a perspective view illustrating certain constructural features;

FIG. 3 is an elevational view of the present invention; and

FIG. 4 is a cross-sectional view taken along lines 4—4, as shown in FIG. 3.

Every year millions of cans containing beer or soft drinks, such as can 10 shown in FIG. 1, are sold. The contents of these cans are generally preferably consumed when cold or at least chilled and, consumption most frequently occurs during hot summer days. Unless the cans are somehow insulated, the contents invariably become warmed to a temperature approaching that of the ambient environment before the contents are fully consumed. This detracts from the enjoyment of the consumption of the fluid and the psychological, if not actual, feeling of being cooled through such consumption.

To reduce the rate of heating of the contents of the cans, various commercially available insulating cup-like devices have been employed. These cup-like devices are molded of styrofoam or polyurethane foam. Such foams crack relatively easily on application of a bending force. Moreover, they are easily gouged on impact with sharp hard objects. And, these cup-like devices are not collapsible which renders them bulky and awkward to handle for storage purposes.

Wrapper 12, as shown in use in FIG. 1, was developed to serve as an insulator for chilled refreshment drinks disposed in cans 10 or bottles. As shown in further detail in FIGS. 2 and 3, wrapper 12 is a sheet of resilient and flexible foam which can be wrapped about a container without danger of cracking or permanently deforming the foam. During non-use, the wrappers are readily laid out flat for stacking one upon the other in a drawer or on a shelf. It may also be appreciated that the wrappers may be packaged for sale in plastic envelopes; the resulting package is no longer than the width and length of the wrapper and of a height equal to the thickness of the number of wrappers stacked on top of one another. Nominal dimensions of wrapper 12 are 10"×4"×⅛".

Wrapper 12 is formed of polyethylene foam. Such foam is resilient and flexible to the degree that it will not become scarred, gouged or cracked during all expected handling and mishandling thereof. Conventional polyethylene foam is not imprintable with most commercially available inks and pigments. As wrapper 12 may be distributed as a novelty item to generate good will on behalf of a distributor, the distributor's message or logo should be imprinted thereon. Additionally, the saleability of wrapper 12 may be enhanced by the printing of jokes, witticisms, cartoons, monograms etc. Such imprinting can be done if the polyethylene foam is irradiated to become what is known in the vernacular of those skilled in the art "cross-linked polyethylene foam". The effect of such irradiation is that of altering the molecular structure to a rubber-like material which will receive ink and pigments. A representative imprinting on the wrapper is shown in FIG. 1.

The size and shape of wrapper 12, for conventional canned drinks, is eleven inches by four inches. This length and width allows for slight overlapping (see FIG. 1) of the ends and permits the upper and lower sides to be proximate the top and bottom edges of the can.

Wrapper 12 is removably maintained in place by the employment of a section of adhesive 18 on surface 20 at end 22 of the wrapper. In operation, upon wrapping wrapper 12 about a can, end 22 is brought into overlapping relationship with opposite end 24. Upon contact therebetween, the two ends will adhere to one another by virtue of adhesive 18.

By experimentation it has been learned that the most commercially practical adhesive to be employed is two-sided adhesive tape. Such tape permits accurate positioning of the adhesive on end 22 and the tape itself serves as a base to prevent the adhesive from remaining upon the surface of end 24 on disengagement of end 22 therefrom. To insure disengagement of the overlapped end with the adhesive or removal of the wrapper, the strength of the adhesive on opposed sides of the tape may be different. Thus, by having the adhesive intermediate the tape and end 22 more strong then the adhesive on the other side of the tape, separation of end 24 from the tape will be assured. Tape, of the type described is available from the 3M Company. Should two sided adhesive tape of different adhering strengths not be available for the required strengths, predeterminable separation between the ends can still be assured if the surface of one of the ends to be adhered is modified. By locating a grid 30 of silicone, release agent, or the like, upon end 24, the area to be adhered to tape 18 can be readily controlled by varying the grid density. Thus, control of the end to which the adhesive remains attached is predeterminable.

Prior to use of wrapper 12, adhesive 18 is protected by a removable cover strip 26 (see FIG. 3) this strip prevents contamination of the adhesive during packaging and handling prior to initial use of the wrapper. To protect adhesive 18 and maintain its adhering qualities between uses of wrapper 12, end 22 may be folded back upon the wrapper to adheringly engage adhesive 18 with a section of surface 20. To promote such folding back, a partial slit 28 is developed parallel to adhesive 18 within surface 30.

Slit 28 also has a secondary purpose. At the point where end 22 begins to overlap end 24, an abrupt change in curvature of the wrapper occurs. Such abrupt change in curvature, depending upon the grade of flexibility of the wrapper, may or may not tend to establish forces which will promote separation between the adhered ends, particularly after the degree of adhesion of adhesive 18 has been reduced through multiple use. Since slit 28 is located at the point of the maximum change of curvature, the bias normally introduced by such curvature is substantially downgraded and the force tending to bring about separation between the adhered ends is substantially reduced.

The crosslinked polyethylene foam found admirably suitable for wrapper 12 is sold under the trademark Volara by Voltek, Inc., of Lawrence, Mass. Grade 2A of this foam does not have as much spring or resiliency as grade 2E. Moreover, it has been learned that when grade 2A is employed, slit 28 may be left out, which represents a substantial savings in manufacturing costs.

It has also been learned that polyehtylene sheet foam which has been treated by a "Corona treatment" (as perfected by the Lily Division of the Owen-Corning Company of Illinois) will accept imprinting thereon by conventional inks and pigments. Thus, either of these types of foam may be employed and retain the insulating and physical properties of polyethylene foam while maintaining the capability of imprinting.

Experimentation has also indicated that wrapper 12, despite the fact that it only extends about the cylindrical surface of a can, will maintain the contents chilled by at least five degrees Fahrenheit over a period of one hour as compared to the temperature of a can maintained in the conventional cup-like styrofoam container. These results were obtained with a $\frac{1}{8}''$ thick wrapper. Greater thickness can be used but additional insulation in view of the normal and expected consumption rate of chilled canned or bottled drinks appears not to warrant the added cost and storage bulk.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A removable reuseable thermal insulator for containers, said insulator comprising in combination:
   (a) a sheet of foam for circumscribingly engaging the container and thermally insulating the portions of the container proximate said sheet from heat transfer intermediate the container and the ambient environment, said sheet including opposed ends; and
   (b) adhesive means for non-permanently securing said opposed ends in positional relationship to one another upon engagement of said insulator about the container and thereby maintaining said insulator mounted upon the container;

whereby, said insulator is removably engageable about and maintainable upon the container to insulate thermally the container from the ambient environment.

2. The insulator as set forth in claim 1 wherein said adhesive means comprises material having an adhesive disposed on at least one surface thereof for adhesively engaging a surface of at least one of said opposed ends.

3. The insulator as set forth in claim 2 wherein a surface of said insulator includes printing visible upon mounting of said insulator about the container.

4. The insulator as set forth in claim 2 wherein said sheet is $\frac{1}{8}$ inch thick.

5. The insulator as set forth in claim 2 wherein said adhesive means includes an adhesive disposed on said material for adhesively engaging surfaces of said sheet proximate each of said opposed ends.

6. The insulator as set forth in claim 5 wherein said sheet comprises polyethylene foam.

7. The insulator as set forth in claim 6 wherein said sheet comprises cross-linked polyethylene foam.

8. The insulator as set forth in claim 7 wherein a surface of said insulator includes printing visible upon mounting of said insulator upon the container.

* * * * *